United States Patent Office 3,781,352
Patented Dec. 25, 1973

3,781,352
PROCESS FOR PREPARING FORMAMIDE IN
THE PRESENCE OF OXYGEN
John O. Hawthorne, Penn Hills Township, Allegheny
County, and Samuel B. Schlosberg, Monroeville, Pa.,
assignors to United States Steel Corporation
Filed Aug. 31, 1971, Ser. No. 176,456
Int. Cl. C07c 103/00
U.S. Cl. 260—561 R                8 Claims

ABSTRACT OF THE DISCLOSURE

The addition of oxygen to the carbon monoxide-ammonia or carbon monoxide-amine reaction system used to prepare formamides significantly increases the reaction rate.

BACKGROUND OF THE INVENTION

Figure 2:
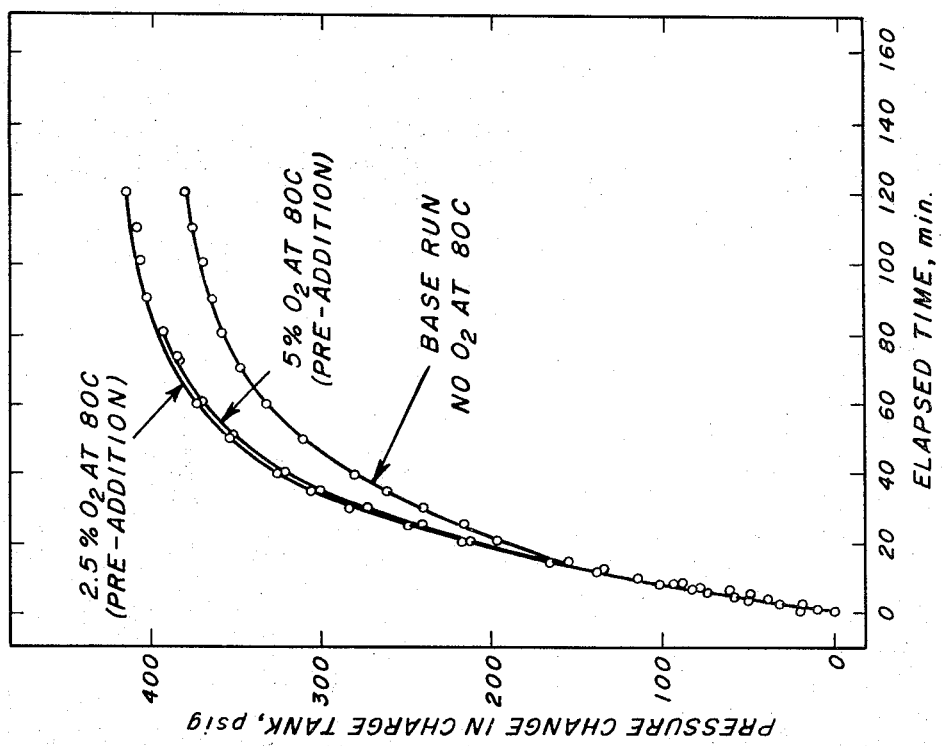
Figure 1:
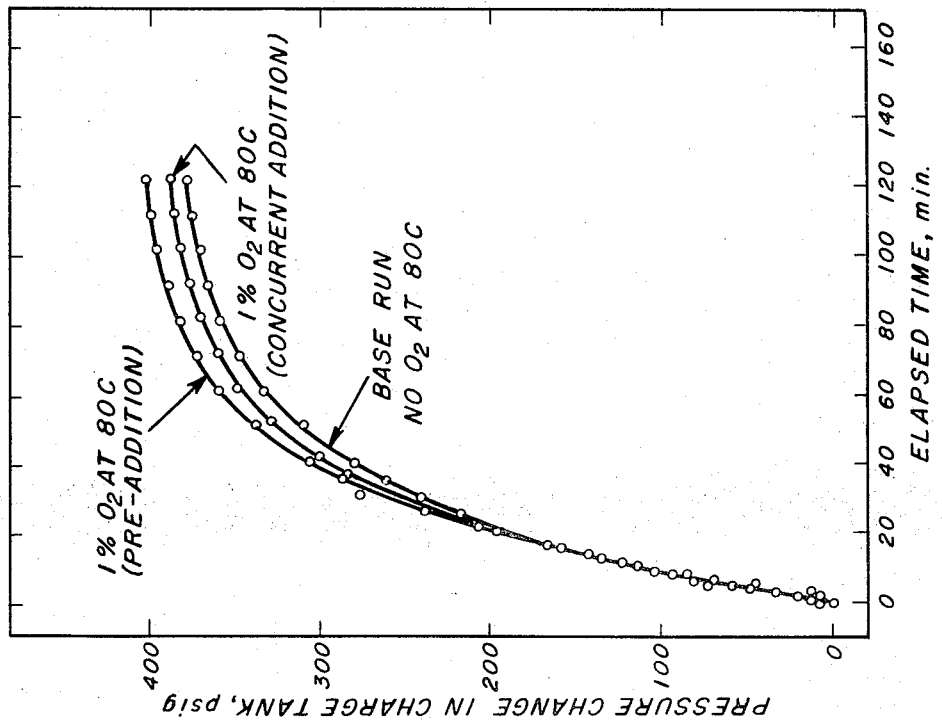

The preparation of formamide and N-substituted formamides from carbon monoxide and ammonia, primary or secondary amines has long been known to the art—U.S. Pats. 1,532,428 and 2,793,211. Widely varying reaction conditions have been reported as has the use of various catalysts. These processes give good yields but require the carbon monoxide reactant to be free of substantial amounts of carbon dioxide, water, U.S. Pat. 2,866,822, and oxygen, British Pat. 823,778. It would be a significant advantage to be able to use carbon monoxide rich off-gas from other processes as an inexpensive raw material for the formamide process. Previous attempts to utilize such carbon monoxide rich off-gases have not proved economically feasible because of the expense of purifying the carbon monoxide to remove the carbon dioxide, oxygen and water before use.

It is an object of this invention to provide a means of using carbon monoxide rich off-gases in the preparation of formamides. It is a further object of this invention to provide an improved process for the preparation of formamides.

SUMMARY OF THE INVENTION

We have now found that gases rich in carbon monoxide such as the off-gas from the basic oxygen furnaces in steel making plants can be advantageously used in the manufacture of formamide without preliminary removal of the oxygen which is always present in such gases. The use of such off-gas is economically feasible because of our unexpected discovery that the oxygen present in basic oxygen furnace off-gas is, contrary to the teachings of the prior art, useful in accelerating the rate of reaction of the carbon monoxide and nitrogen containing material to form formamides. It had been expected that the oxygen present in the carbon monoxide stream would deactivate the catalyst used by forming sodium formate. Thus, Bankowski et al. British Pat. 823,778 teaches that oxygen in amounts of 0.01% or more seriously impedes the conversion to formamide. West German Pat. 1,142,-163 indicates that the presence of oxygen, as well as of carbon dioxide or water, is detrimental to formamide synthesis due to the tendency to form salts which foul the reactor. The process of the patent obviated this difficulty by injecting the raw materials into the reactor in the form of a fine mist. However, the oxygen level in the CO stream was at a low level (0.25%) and, even so, purification procedures prior to use were necessary (col. 6, line 31). Also, it is probable that this modification causes a decrease in the throughput rate and adversely affects the quantity of formamide produced per unit of reactor volume.

Surprisingly, we have found that the presence of from about 1 to about 5 mol percent oxygen in the carbon monoxide stream gives a substantial rate increase without adversely affecting the quantity or purity of the formamide produced. Rather than effecting a decrease in reaction rate, which was expected, we have obtained a significant increase, on the order of 10 to 20%, in the reaction rate thereby obtaining dual benefits, i.e. cheaper feedstock and faster reaction.

DETAILED DESCRIPTION

Generally, formamides are produced from carbon monoxide and ammonia or a primary or secondary aliphatic amine at or above ambient temperature and at pressures ranging from 3 to 1000 atmospheres in an aliphatic alcohol in contact with a catalyst capable of promoting the reaction between the amine and carbon monoxide. It should be understood that our process further described below is not limited to the use of a specified temperature, pressure, alcohol, amine or catalyst. Rather, our process is useful over a widely varying range of reaction conditions.

Thus, we contemplate temperatures in the range of from about 20° C. up to about 260° C. with temperatures in the range of from 80–100° C. being preferred and pressures in the range of from about 10 to about 200 atmospheres, with pressures in the range of 30–100 atmospheres being preferred and a pressure of 50 atmospheres being most preferred. As the temperature and pressure of the system increase, so also does the rate of reaction. At temperatures and pressures in the high end of the respective ranges, the increased reaction rate tends to mask the increase obtained through the practice of our invention. For this reason, we would contemplate operation usually in the lower end of the temperature and pressure ranges so as to obtain higher reaction rates without the use of special high temperature and high pressure resistant equipment.

The alcohol used may be any monohydric lower aliphatic alcohol, linear or branched. We prefer linear alcohols having 1 to 4 carbon atoms in the chain, branched alcohols having 1 to 3 carbon atoms in the chain and most prefer methyl alcohol. The mole ratio of alcohol to amine should be about 0.10, preferably about 0.50. Ammonia or a primary or secondary amine may be used as the nitrogen source depending on the specific amide to be prepared. Suitable amines include those set forth in U.S. Pat. 2,793,211, col. 2 lines 5 et seq., incorporated herein by reference.

Any of the commonly used catalysts may be used. The catalysts used are usually metallic alkoxides but alkali metals, especially sodium and potassium, choline and choline derivatives, sodamide, the sodium salts of triphenylcarbinol, ethylacetoacetate and triphenylmethane, and sodium glycerate have also been used. We have found sodium methoxide preferable. The catalyst should ordinarily be present in an amount equal to about 0.2 weight percent or more of the composition. Best results are ordinarily obtained when the catalyst is present in an amount in the range of 0.5 to 2 weight percent.

In the practice of our invention, 1 to 5 mol percent oxygen is added to the reaction system. The oxygen may be premixed with the carbon monoxide, it may already be present in the carbon monoxide stream, or it may be injected independently.

Our invention is further illustrated by the following non-limiting examples.

EXAMPLE 1

A 1-liter 316 stainless steel autoclave system that included 37.2 g. (2.18 moles) of ammonia contained in a 75 ml. stainless steel Hoke bomb was purged with nitrogen and then charged with 70.5 g. of a methanolic solution containing 1 mole percent of sodium methoxide catalyst.

The ammonia was introduced into the autoclave and the resulting solution was heated to 73° C. with stirring. When the reactor contents had reached 73° C., the stirrer was stopped and the autoclave was charged with dry, $CO_2$-free carbon monoxide from a compressor to a pressure of 750 p.s.i.g. The stirrer was started again and this was taken as zero time. The temperature quickly rose from 73° C. to 80° C. due to the exothermic nature of the reaction, and was maintained at 80±1° C. by regulating the heater and by means of cooling water circulating inside the reactor.

During the two-hour reaction time, the reactor pressure was maintained at 750 p.s.i.g. by the continuous addition of carbon monoxide from a charge tank at 21° C. The initial pressure and pressure drop in the charge tank was recorded as a function of time. After two hours, the contents of the reactor were allowed to cool to room temperature, the gases were vented, and the liquid product was recovered.

During this experiment, the initial pressure was 1482 p.s.i.g. and a pressure drop of 379 p.s.i.g. occurred in the carbon monoxide charge tank. The tank had a volume of 2.101 liters. The weight of liquid product was 163.2 g. and the yield of formamide was 94.5 g. (96.0% yield). Calculation using the ideal gas law of the expected CO pressure drop at an ambient temperature of 21° C. due to conversion of the ammonia to formamide enabled the reaction time (75 minutes) to be read from FIG. 2.

EXAMPLE 2

The procedure of Example 1 was repeated except that a second Hoke bomb containing 1.75 g. of oxygen was included in the system. This quantity of oxygen was equivalent to 2.5 mol percent of the carbon monoxide charged and the oxygen to catalyst mole ratio was 2.5 to 1. The oxygen was admixed with the compressed carbon monoxide that initially pressurized the reactor to 750 p.s.i.g. An initial pressure of 1507 p.s.i.g. and a pressure drop of 414 p.s.i.g. in the 2.101-liter carbon monoxide charge tank were recorded during the course of the experiment. Ambient temperature was 27° C. The weight of recovered liquid product was 167.5 g., and the yield of formamide was 97.5 g. (99.0/ yield). The reaction time was found to be 54 minutes by use of FIG. 2.

The decrease in reaction time from 75 to 54 minutes for total conversion of the ammonia indicated that the addition of 2.5 mol percent oxygen increased the reaction rate 28 percent at 80° C.

The following examples illustrate the effect of the addition of 2.5 mol percent oxygen at 100° C.

EXAMPLE 3

The procedure of Example 1 was repeated except that the carbon monoxide was admitted at 89° C. and the reaction mixture was maintained at 100±1° C. An initial pressure 1472 p.s.i.g. and a pressure drop of 418 p.s.i.g. were recorded in the 2.101-liter carbon monoxide charge tank during the cource of the experiment. Ambient temperature was 23° C. The recovered liquid product weighed 169.8 g. and the yield of formamide was 96.8 g. (98.4% yield). Calculation of the expected carbon monoxide consumption and use of FIG. 3 indicated that all of the ammonia was converted to formamide after 34.5 minutes.

EXAMPLE 4

Figure 3:
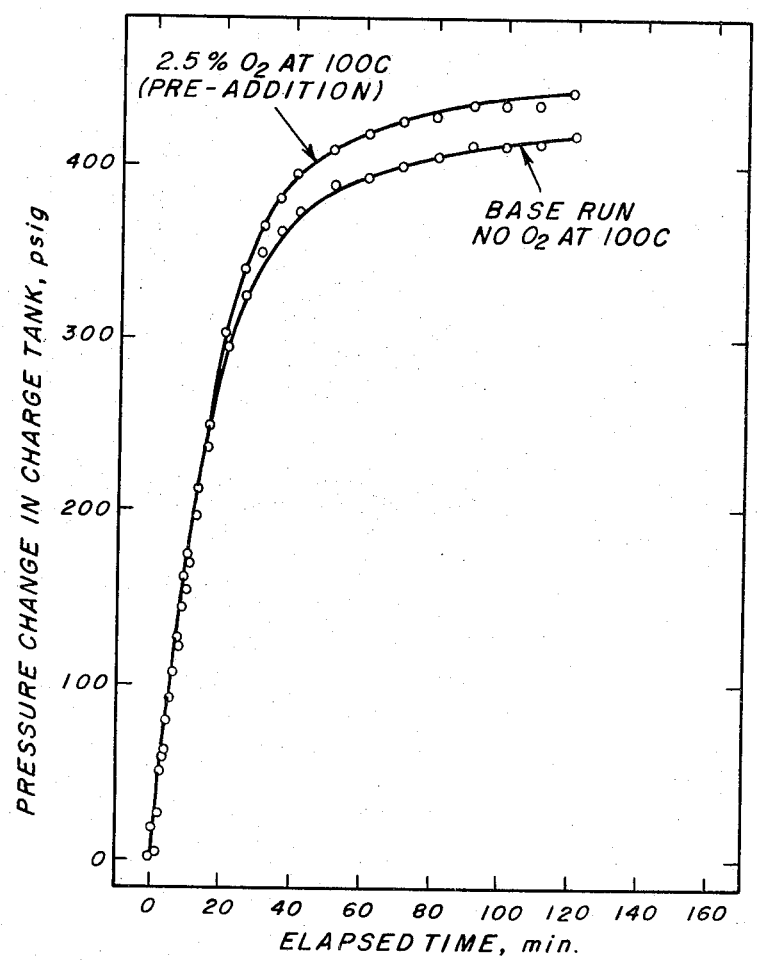

The procedure of Example 1 was repeated except for two changes. One, a second Hoke bomb containing 1.75 g. of oxygen was included in the system to supply oxygen equivalent to 2.5 mol percent of the carbon monoxide charged and secondly, the reaction was initiated and maintained at 100±1° C. During this experiment an initial pressure 1517 p.s.i.g. and a pressure drop of 444 p.s.i.g. were recorded in the 2.101-liter carbon monoxide charge tank pressure. Ambient temperature was 31° C. The recovered liquid product weighed 170.8 g. and the yield of formamide was 98.2 g. (99.8% yield). Calculation of the expected carbon monoxide consumption and use of FIG. 3 showed that all of the ammonia was converted in 31 minutes.

The decrease in reaction time from 34.5 to 31 minutes for total conversion of the ammonia indicated that the addition of 2.5 mol percent oxygen increased the reaction rate 10 percent of 100° C.

The following tables illustrate the effect of adding oxygen on the synthesis of formamide. Table I, for example, illustrates that the addition of oxygen does not have a detrimental effect on formamide production. It also shows that the percentage increase of methyl formate in the liquid product is accompanied by a decrease in the methyl alcohol percentage as the amount of added oxygen increases. The effect of added oxygen appears to level out at 5 mol percent.

TABLE I
Effect of oxygen on the synthesis of formamide at 80° C.

| Run | No oxygen | 1% $O_2$ | 2.5% $O_2$ | 5% $O_2$ |
|---|---|---|---|---|
| Weight of product, g | 163.2 | 167.5 | 167.5 | 168.8 |
| Formamide: | | | | |
| Weight percent | 57.9 | 58.7 | 58.2 | 57.9 |
| Yield, g | 94.5 | 98.3 | 97.5 | 97.7 |
| Percent yield | 96.0 | 99.9 | 99.0 | 99.3 |
| Methyl formate: | | | | |
| Weight percent | 1.8 | 3.2 | 4.7 | 5.3 |
| Yield, g | 2.9 | 5.4 | 7.9 | 8.9 |
| Methanol: weight percent | 39.5 | 37.9 | 36.8 | 36.5 |
| Others: weight percent (by analysis) | 0.8 | 0.2 | 0.3 | 0.3 |

When the contribution of the residual solvent is excluded from the other components of the liquid product, the percent by weight of formamide and methyl formate in the product mixture is given in Table II.

TABLE II
Effect of oxygen on product distribution at 80° C.

| Run | No oxygen | 1% $O_2$ | 2.5% $O_2$ | 5% $O_2$ |
|---|---|---|---|---|
| Formamide: weight percent of product | 95.7 | 94.5 | 92.1 | 91.2 |
| Methyl formate: weight percent of product | 3.0 | 5.2 | 7.4 | 8.3 |
| Others: weight percent of product (by analysis) | 1.3 | 0.3 | 0.5 | 0.5 |

The effect of the presence of oxygen on carbon monoxide consumption and reaction time at 80° C. is depicted in Table III.

TABLE III
Effect of oxygen on carbon monoxide consumption and reaction time at 80° C.

| Run | No oxygen | 1% $O_2$ | 2.5% $O_2$ | 5% $O_2$ |
|---|---|---|---|---|
| Moles carbon monoxide converted to formamide and methyl formate | 2.147 | 2.272 | 2.294 | 2.319 |
| Time for 100% conversion of ammonia to formamide, min | 75 | 62.5 | 54 | 55 |
| Percent increase in reaction rate at 80° C | | 17 | 28 | 27 |

This data indicates that carbon monoxide-containing off-gas streams containing 1 to 5 mol percent oxygen may be utilized for the synthesis of formamide and that oxygen-free carbon monoxide streams should have 1 to 5 mol percent oxygen added.

We claim:

1. The process for the production of formamide comprising:
   (a) mixing together ammonia, carbon monoxide and oxygen, said oxygen being about 1 to 5 mol percent of said carbon monoxide,
   (b) reacting said mixture in the presence of a catalyst at a temperature of from about 20° C. to about 260° C. and at a pressure from about 10 to 200 atmospheres, and
   (c) recovering said formamide.

2. The process of claim 1 wherein said catalyst is an alkali metal alkoxide.

3. The process of claim 2 wherein said alkoxide is dissolved in a lower alkanol.

4. The process of claim 3 wherein said alkoxide is sodium methoxide.

5. The process of claim 1 wherein said oxygen is present in amounts of about 1 to 3 mol percent of said carbon monoxide.

6. The process of claim 3 wherein said alcohol is methanol.

7. The process of claim 1 wherein the temperature is in the range of about 80–100° C. and the pressure is in the range of about 30–100 atmospheres.

8. The process of claim 7 wherein the temperature is about 80° C. and the pressure is about 50 atmospheres.

References Cited

UNITED STATES PATENTS

| 2,204,371 | 6/1940 | Loder | 260—561 R |
| 3,412,151 | 11/1968 | Nozaki | 260—561 R |

FOREIGN PATENTS

| 1,146,869 | 8/1958 | Germany | 260—561 R |
| 572,437 | 3/1959 | Canada | 260—561 R |

LEWIS GOTTS, Primary Examiner

E. G. LOVE, Assistant Examiner

U.S. Cl. X.R.

260—478